US011068485B2

(12) United States Patent
Beacom et al.

(10) Patent No.: US 11,068,485 B2
(45) Date of Patent: *Jul. 20, 2021

(54) REDUCING A LARGE AMOUNT OF DATA TO A SIZE AVAILABLE FOR INTERACTIVE ANALYSIS

(71) Applicant: International Business Machines Corporation, Armonk, NY (US)

(72) Inventors: Oliver J. Beacom, Manotick (CA); John W. Bell, Lees Summit, MO (US); Paul C. Jones, Ottawa (CA); James S. Luke, Isle of Wight (GB); Luke Morgan, Cambridgeshire (GB); Royston W. Shufflebotham, Cambridge (GB); Mark L. Todd, Cambridge (GB)

(73) Assignee: International Business Machines Corporation, Armonk, NY (US)

( * ) Notice: Subject to any disclaimer, the term of this patent is extended or adjusted under 35 U.S.C. 154(b) by 114 days.

This patent is subject to a terminal disclaimer.

(21) Appl. No.: 16/291,279

(22) Filed: Mar. 4, 2019

(65) Prior Publication Data

US 2019/0220465 A1    Jul. 18, 2019

Related U.S. Application Data

(63) Continuation of application No. 14/983,885, filed on Dec. 30, 2015, now Pat. No. 10,311,059, which is a
(Continued)

(51) Int. Cl.
*G06F 16/00* (2019.01)
*G06F 16/2455* (2019.01)
(Continued)

(52) U.S. Cl.
CPC ...... *G06F 16/24554* (2019.01); *G06F 16/248* (2019.01); *G06F 16/2425* (2019.01); *G06F 16/2455* (2019.01)

(58) Field of Classification Search
CPC .......... G06F 16/24554; G06F 16/2425; G06F 16/2455; G06F 16/248
(Continued)

(56) References Cited

U.S. PATENT DOCUMENTS 7,747,614 B2    6/2010   Freeman et al.
7,890,519 B2 *  2/2011   Dettinger ............ G06F 16/2458
                                                   707/752
(Continued)

OTHER PUBLICATIONS

"Dynamic Reduction of Query Result Sets for Interactive Visualization"; By: Leilani Battle; Published 2013 https://ieeexplore.IEEE.org/stamp/stamp.jsp?tp=&arnumber=6691708.*
(Continued)

*Primary Examiner* — Chelcie L Daye
(74) *Attorney, Agent, or Firm* — Anthony V. England; Edell, Shapiro & Finnan, LLC

(57) ABSTRACT

Identifying data within a data store satisfying a request. A quantity of the identified data is greater than a threshold. The identified data is analyzed to produce an initial result set with a reduced data quantity including information summarizing the identified data. The analyzing includes visualizing the information summarizing the identified data as one or more graphical displays rendered within a user interface and selectively filtering the identified data based upon a selection of filter factors associated with the identified data to generate an initial result set having a smaller size in relation to the identified data set. Each of one or more succeeding result sets are generated from a corresponding prior result set until a succeeding result set includes a quantity of data satisfying the threshold. The generating of each succeeding result set includes filtering the corresponding prior result set and information summarizing the filtered result set.

20 Claims, 7 Drawing Sheets

Related U.S. Application Data continuation of application No. 14/609,699, filed on Jan. 30, 2015, now Pat. No. 9,892,164.

(51) Int. Cl.
*G06F 16/248* (2019.01)
*G06F 16/242* (2019.01)

(58) Field of Classification Search
USPC .................................................. 707/722, 752
See application file for complete search history.

(56) References Cited

U.S. PATENT DOCUMENTS

| | | | |
|---|---|---|---|
| 8,452,792 | B2 | 5/2013 | Barga et al. |
| 8,682,925 | B1 | 3/2014 | Marquardt et al. |
| 8,819,038 | B1 | 8/2014 | Rhodes et al. |
| 8,874,549 | B2 | 10/2014 | Tunkelang et al. |
| 9,043,397 | B1 | 5/2015 | Ravichandran |
| 2007/0011175 | A1* | 1/2007 | Langseth .............. G06F 16/254 |
| 2012/0166447 | A1 | 6/2012 | Nice et al. |
| 2013/0346429 | A1 | 12/2013 | Bratz et al. |
| 2014/0101178 | A1 | 4/2014 | Ginter |
| 2014/0156638 | A1 | 6/2014 | Joshi et al. |
| 2014/0279794 | A1 | 9/2014 | Aliferis et al. |
| 2014/0282227 | A1 | 9/2014 | Nixon et al. |
| 2016/0224616 | A1 | 8/2016 | Beacom |

OTHER PUBLICATIONS

Battle et al.; "Dynamic Reduction of Query Result Sets for Interactive Visualization", Big Data, 2013 IEEE International Conference on, Oct. 6-9, 2013, pp. 1-8.

Leung et al.; "Reducing the Search Space for Big Data Mining for Interesting Patterns from Uncertain Data", Big Data (BigData Congress), 2014 IEEE International Congress on, Jun. 27-Jul. 2, 2014, pp. 315-322.

Kantere, Verena; "A Holistic Framework for Big Scientific Data Management", Big Data (BigData Congress), 2014 IEEE International Congress on, Jun. 27-Jul. 2, 2014, pp. 220-226.

List of IBM Patents or Patent Applications Treatedas Related, Mar. 4, 2019, 1 page.

* cited by examiner

REDUCING A LARGE AMOUNT OF DATA TO A SIZE AVAILABLE FOR INTERACTIVE ANALYSIS

CROSS-REFERENCE TO RELATED APPLICATIONS

This application is a continuation of U.S. patent application Ser. No. 14/983,885, entitled "REDUCING A LARGE AMOUNT OF DATA TO A SIZE AVAILABLE FOR INTERACTIVE ANALYSIS" and filed Dec. 30, 2015, which is a continuation of U.S. Pat. No. 9,892,164, entitled "REDUCING A LARGE AMOUNT OF DATA TO A SIZE AVAILABLE FOR INTERACTIVE ANALYSIS" and filed Jan. 30, 2015, the disclosures of which are incorporated herein by reference in their entirety.

BACKGROUND

1. Technical Field

Present invention embodiments relate to interactive analysis of a subset of data from a massive storage (e.g., peta-bytes) of data.

2. Discussion of the Related Art

There are a number of industries that require analysis of large amounts of data, both structured and unstructured, in order to obtain meaningful access to a smaller subset of data that is of interest. For example, investigative agencies, such as law enforcement, intelligence and counter-fraud agencies, have access to very large (e.g., peta-bytes in data size) sources of data including call records, financial and/or computerized (electronic) transactions, etc. When combined with other conventional types of date, including unstructured data (e.g., intelligence reports), entity-link-property (ELP) data, it becomes a massive task for an analyst to handle such massive amounts of data to obtain a meaningful subset of the data for a particular search or analysis. In particular, consider typical sources of call data records, which may include a number of years of data for several million individuals, resulting in excess of one trillion items of data.

Such data cannot be processed for visual, interactive analysis due to the size of result sets obtained from the data source. For example, result sets that need to be analyzed, while smaller than the overall data source, are still too large to be stored in the memory of a conventional desk top or other computer or for analysis by conventional data analysis tools. In addition, the result sets that need to be analyzed cannot be visualized using conventional techniques, and the result sets are also too large to be transferred between computing devices or nodes due to a lack of available network bandwidth that would be required for such transfers.

SUMMARY

According to one embodiment of the present invention, a computer-implemented method of processing a request for data comprises identifying data within a data store satisfying the request, wherein a quantity of the identified data is greater than a threshold, and analyzing the identified data to produce an initial result set with a reduced amount of data including information summarizing the identified data. The analyzing the identified data further includes visualizing the information summarizing the identified data as one or more graphical displays of data rendered within a user interface, and selectively filtering the identified data based upon a selection of a plurality of different filter factors associated with the identified data to generate an initial result set that is smaller in size in relation to the identified data set. Generating one or more succeeding result sets each from a corresponding prior result set until a succeeding result set includes a quantity of data that is at or below the threshold. Each succeeding result set includes a reduced amount of data relative to the corresponding prior result set. The generation of each succeeding result set includes filtering the corresponding prior result set and generating that succeeding result set including information summarizing the filtered result set.

Embodiments of the present invention further include a system and computer program product for processing a request for data including features similar to those described above.

BRIEF DESCRIPTION OF THE SEVERAL VIEWS OF THE DRAWINGS

Generally, like reference numerals in the various figures are utilized to designate like components.

DETAILED DESCRIPTION

Figure 1:
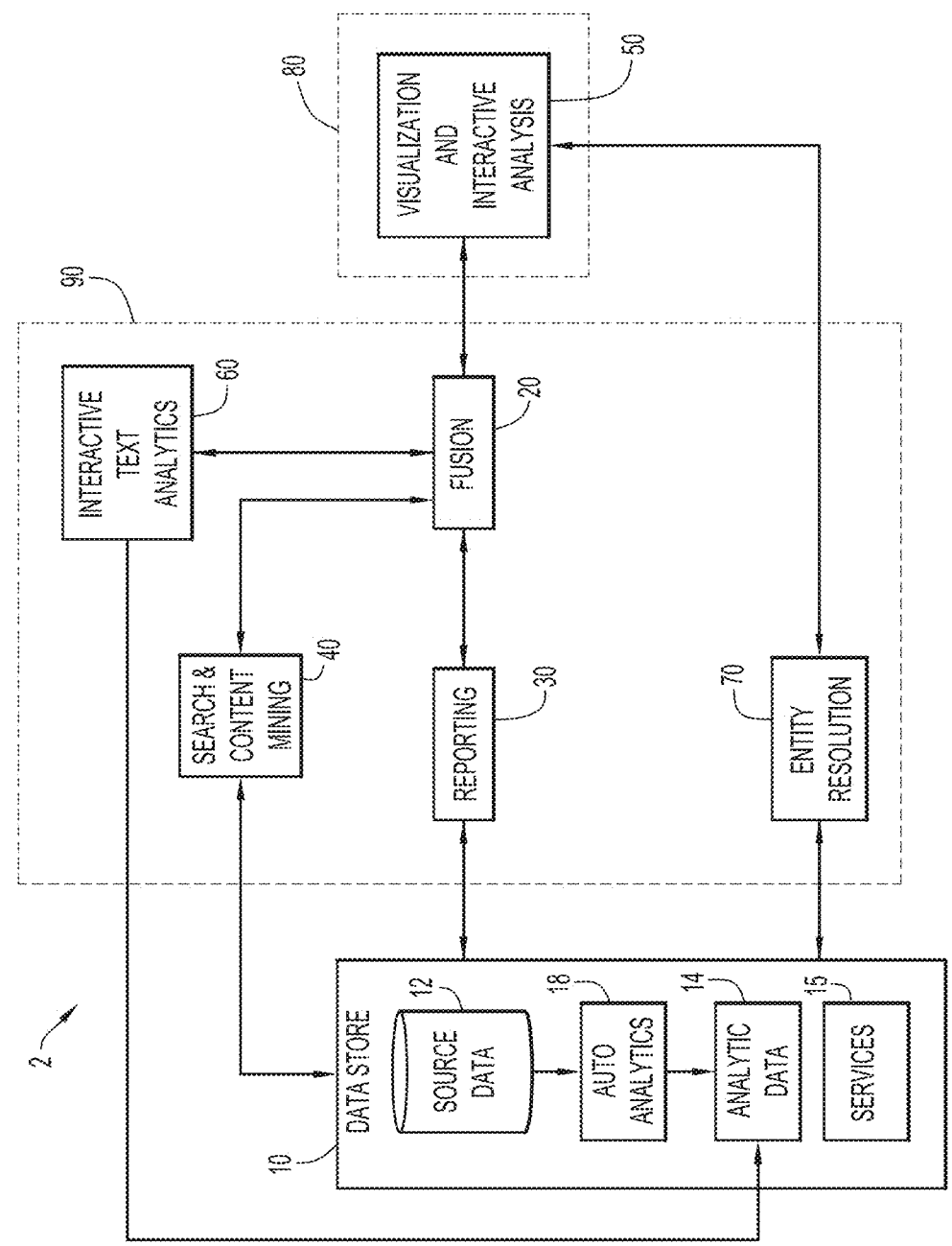
FIG. 1 is a diagrammatic illustration of an example system architecture for implementing an embodiment of the present invention.

Embodiments of the present invention enable real-time interaction with large amounts (e.g., peta-bytes or larger) of data to allow an analyst to filter result sets that can be analyzed by visual analytic tools. In particular, embodiments of the present invention facilitate processing of a request by an analyst for an analytic (e.g., a request for data based upon a search query, a find path request for finding a shortest path of all possible paths between two or more nodes of structured data, a request for geo-spatially related data (e.g., find entities within a defined area having a similar attribute such as the same type of credit card, etc.) within a data store comprising large amounts of data. A subset of data is identified within the data store that satisfies the request. However, due to the large size of data within the data store, the data subset can be greater than a threshold for allowing the data to be analyzed with data analysis tools available to the analyst (e.g., at a computing device of the analyst). Identified information within the data subset is summarized according to one or more facets to produce an initial result set with a reduced amount of data including information summarizing the identified data based upon the one or more facets. The analyst, utilizing the available data analysis tools, can filter the identified data so as to generate one or more succeeding result sets (where each succeeding result set is generated from a corresponding prior result set, and each succeeding result set includes information summarizing a reduced amount of identified data relative to the corresponding prior result set) until a succeeding result set is generated that includes information summarizing identified data to an amount that is at or below the threshold. Each succeeding result set that is generated based upon a filtering of the corresponding prior result set includes information summarizing the succeeding result set.

Embodiments of the present invention facilitate identified information to be provided for use by one or more analysis tools of the analyst only when the size of the filtered identified information is reduced to a level that is at or below the threshold. However, the embodiments of the present invention facilitate an analysis of a representation of the identified information based upon the facets associated with the identified information. This enables the analyst to visualize and further reduce the identified information, using the visualization tools in accordance with the present invention, so as to obtain a meaningful result set that has been sufficiently filtered to a data size that permits a more detailed analysis of the data.

Embodiments of the present invention are useful for a number of applications in which large amounts of data need to be analyzed for a particular scenario. For example, consider law enforcement or other investigative agencies that need to peruse call data records within densely populated areas over a designated time period in order to find information pertaining to a particular investigation. The number of call records that might be within a data store available for searching, depending upon the population density for a particular area (e.g., New York City, Los Angeles, Chicago, etc.) and a selected time period (e.g., days or months), could easily number in the trillions. The embodiments of the present invention facilitate visualization by a data analyst of a reduced size of the initially identified search result information, where the size reduced information is visualized within a user interface for the analyst based upon facets associated with the search result information, and the analyst can filter the search result information (e.g., in an iterative process, with one or further filter operations being performed) until the search result information has been sufficiently reduced to a manageable size to be analyzed in greater detail by the analyst (utilizing analysis tools).

An example system architecture for implementing embodiments of the present invention is illustrated in FIG. 1. In particular, the system 2 includes a scalable data store 10 comprising source data 12 and analytic data 14. The data store 10 can include any suitable number of databases comprising any one or more suitable computing devices providing data storage and one or more suitable processors configured to execute instructions associated with one or more software modules that facilitate performance of database operations including parallel database operations (such as extract, transform and load operations) as well as other analytic processing operations of the stored data.

The data stored by the data store 10 includes both structured and unstructured data, where structured data can be obtained by analysis of the unstructured data. For example, the data store 10 can include structured data such as transactional data (e.g., call data records, financial transactions, computer/internet transactions, etc.), documents data (e.g., documents such as reports, graphs, etc. containing unstructured data of interest), entity data (e.g., data relating to persons or individuals) and entity-link-property (ELP) data. Unstructured data can be analyzed as described herein to extract entity and relationship data from the unstructured data so as to define facets of the data, where the facets are then used to summarize the identified data from an analytic request to generate result sets including data summary reports. The summary reports can be provided in a visualized format at an interactive user interface of the computing device of an analyst to facilitate filtering of result sets so as to reduce the amount of identified information to a manageable level.

The data store 10 further includes a data store services module 15 including any suitable number of software applications that facilitate processing of the data (e.g., performing analytic services to identify and associate data, finding shortest paths or find path techniques within graph analytics associated with the data, finding common neighbors within graph analytics associated with the data) as well as other services associated with the data (e.g., services supporting searching of data within the data store 10).

An auto analytics module 18 provided within the data store 10 includes one or more software programs that analyze the source data 12 within the store (e.g., by running automated batch jobs on the data) and generate analytic data 14 within the store based upon algorithms for identifying relationships between elements or instances of the source data. For example, the auto analytics module 18 can automatically generate summary graphs of source data, where the summary graphs can then be searched utilizing the services module 15 (e.g., using find path techniques for the summary graphs). An example of a summary graph or source data is in relation to a collection of call records, where the summary graph includes data nodes and links between nodes based upon relationships between the nodes. The nodes can represent one or more calls, including a single node representing multiple calls (e.g., multiple calls between the same people, such as caller A and caller B). The analytic data 14 can be used to generate facets for summarizing the identified information of an analytic request within a result set.

In an example embodiment, the data store 10, including modules of the data store, is implemented utilizing a software platform commercially available from IBM Corporation under the trademark Pure Data for Operational Analytics (PDOA).

The system 2 also includes any suitable number of computing devices that communicate and exchange data with the data store 10 via any suitable one or more wired and/or wireless networks. The network(s) may be implemented by any number of any suitable communications media (e.g., wide area network (WAN), local area network (LAN), Internet, Intranet, etc.). Each of the computing devices includes one or more processors configured to perform operations as described herein based upon instructions provided by software applications within software modules and/or platforms stored within memories of the computing devices.

The system 2 includes a fusion module 20 with one or more suitable software applications that facilitate analyst operations of searching of the data store 10 and providing search results to a computing device of the analyst, via a visualization and interactive analysis module 50 as described herein. All search and/or other analytic requests and search results as described herein are routed for processing by the fusion module 20. The fusion module 20 facilitates collection and consolidation or fusion of data result sets for presentation to the analyst via module 50 in a useful manner. In an example embodiment, the fusion module 20 is implemented utilizing software commercially available from IBM Corporation under the trademark Intelligence Analysis Platform (IAP).

The fusion module 20 utilizes a reporting module 30 to execute search and/or other analytic operations for obtaining data from data store 10 (e.g., via interactions between the reporting module 30 and the services module 15 of the data store 10). As described herein, the reporting module 30 returns data from a search or other analytic request as one or more summary reports to the fusion module 20. The summary reports provided by the reporting module 30 to the fusion module 20 enable an analyst to refine the search results and/or analytic parameters of the search results in order to efficiently reduce or filter the size of the identified information originally obtained from the analytic request to a manageable size for further analysis and processing by the analyst (e.g., at the computing device of the analyst). The reporting module 30 summarizes data identified by a search or other analytic request utilizing facets associated with the identified data in order to generate the summary reports representing a visualization of the data at a smaller data size. The facets comprise information about relationships between instances of data, which can be obtained using the analytic data 14 generated within the data store by the auto analytics module 18 as well as other modules as described herein. In an example embodiment, the fusion module 20 is implemented based upon software commercially available from IBM Corporation under the trademark Cognos.

A search and content mining module 40 interacts with the fusion module 20 and data store 10 and includes one or more suitable software applications that facilitate searching of the data store 10 and also unstructured content mining, entity and relationship extraction against unstructured content for data within the data store 10. In an example embodiment, module 40 crawls unstructured content of the source data 12 and applies text analytics annotators according to any one or more suitable algorithms to extract entity and relationship data into a structured form. The structured form of this data can used to generate analytic data 14 within the data store 10 and/or used by other modules within the system 2 (e.g., the reporting module 30 and/or the entity resolution module 70). The search and content mining module 40 can also enable analysts (operating, e.g., via visualization and interactive analysis module 50) to input information that identifies correlations and links instances of data within the source data 12, such as an identification of an association between entity data (e.g., Abraham Lincoln) and document data (e.g., "Gettysburg Address"). Module 40 enables a selection of a subset of unstructured content, such as unstructured documents, and further the limiting of analysis of data extracted from unstructured content to that which originates from the selected subset (e.g., analysis of extracted entity and relationships data from the unstructured content is limited to what has originated from the selected subset). In an example embodiment, the search and content mining module 40 utilizes a software platform commercially available from IBM Corporation under the trademark Watson Content Analytics to perform such operations.

The system 2 includes a visualization and interactive analysis module 50 that interacts with the fusion module 20 and also facilitates interaction of a user or analyst within the system. In particular, module 50 includes one or more suitable software applications that provide a user interface for the analyst (e.g., a user interface as depicted in FIGS. 3-7). The visualization and interactive analysis module 50 enables an analyst to initiate searches and other analytic requests by the fusion module 20 as well as filter the search requests based upon visualized displays of generated search reports as described herein. In an example embodiment, the visualization and interactive analysis module 50 is implemented utilizing software commercially available from IBM Corporation under the trademark IBM® i2® Analyst's Notebook®.

An interactive text analytics module 60 includes one or more suitable software applications that interact with the fusion module 20 and the data store 10 to facilitate manual analysis of source data 12 so as to generate analytic data 14 (e.g., by identifying relationships between one or more types of unstructured data). For example, an analyst using the visualization and interactive analysis module 50 and fusion module 20 can analyze source data and manually generate and/or validate analytic data that provides associations or links between related data (e.g., associating entity data for two entities, such as person A and person B, based upon a known relationship of which the analyst is aware).

The system further includes an entity resolution module 70 that links the visualization and interactive analysis module 50 directly with the data store 10. This module 70 includes one or more suitable software applications that read entity data from the data store 10 and perform entity and relationship resolution operations. For example, the entity and relationship resolution operations can facilitate the generation of entity graphs (and/or the resolution of already formed entity graphs) that link entity data with other types of data within the data store, where the entity graphs can be searched by an analyst via the visualization and interactive analysis module 50 and/or utilized by data store 10 (e.g., the data store services module 15) for providing further analytic operations with the data stored therein. In an example embodiment, the entity resolution module 70 analyzes two or more data elements or instances of data (e.g., two or more data records, two or more rows of data within a table, etc.) to determine whether the instances of data represent the same entity. When two or more instances of data are determined as representing the same entity, these instances of data can be consolidated as a single entity for the summary reports generated by the reporting module 30. This process can be performed manually by an analyst (via the visualization and interactive analysis module 50) and/or automatically by the entity resolution module 70.

The entity resolution module 70 is further configured to export entity graph data and/or other types of data back to the data store 10. This facilitates access and use of resolved entity graphs by the data store 10 as well as other system modules (e.g., utilizing analytic tools such as find path tools) in addition to updating the analytic data within the data store (by resolving entity issues such as reducing multiple data elements for the same entity). A resolved entity graph generated by module 70 can significantly reduce clutter in a graph, e.g., by collapsing multiple instances of the same entity (e.g., the same person using different aliases) into a single entity within the graph. Module 70 can be configured to provide automated updates in resolved entity graphs for the data store 10 or, alternatively, provide such updates which are manually reviewed by an analyst prior to implementing resolved entity graphs into the data store 10.

In an example embodiment, the entity resolution module 70 is implemented utilizing software commercially available from IBM Corporation under the trademark Infosphere Identity Insight.

Thus, the system 2 facilitates analysis of the source data 12, both automatically (via the auto analytics module 18 and the entity resolution module 70) as well as manually by an analyst (utilizing the visualization and interactive analysis module 50 in combination with the interactive text analytics module 60 and/or the entity resolution module 70), to generate analytic data 14 so as to generate structured data by extracting entities and relationships from the unstructured data which facilitates adequate searching of the data store 10 to produce useful search results.

The analytic data 14 that is obtained further facilitates the summarization of data by the reporting module 30 so as to present summary reports in a chart or graph-based format that can be visualized using the user interface implemented by the visualization and interactive analysis module 50. In particular, the reporting module 30 summarizes identified data within the data store 10 from a search or other analytic request based upon facets associated with the identified data, where the facets define relationships between instances of data based upon information such as the analytic data 14 within the data store 10. As an example, consider identified data based upon a search request that includes call data records for a city over a specified period of time. An initial summary report generated by the reporting module 30 for the call records may comprise a graph with points or nodes representing entities with links between nodes representing calls between entities. Facets utilized to generate the summary report can include, e.g., information obtained from the analytic data 14 providing to relationships between entities, where multiple calls between two or more entities may be summarized as a facet comprising a single link between the entities. Other facets can also be utilized to define other types of relationships between entities and/or other types of data for purposes of generating a summary report of identified data by the reporting module 30.

The system modules can be stored and implemented within computing devices and/or other hardware components in any suitable manner within the system 2. As previously noted, the auto analytics module 18 can be implemented within computing devices and/or other hardware component(s) of the data store 10. Any one or more of modules 30, 40, 50, 60 and 70 can be implemented along with the fusion module 20 within one or more of the same computing devices or in any other one or more other computing devices, where each one or more computing devices comprise one or more memory structures to store module(s) as well as one or more processors configured to perform operations in accordance with computer readable program instructions provided by the software application(s) of the modules. In an example embodiment, the visualization and interactive analysis module 50 can be implemented within one or more computing devices of the analyst (e.g., a personal computer of the analyst, represented as dashed line element 80 in FIG. 1), which is separate from one or more computing devices implementing the fusion module 20, reporting module 30, search and content mining module 40, interactive text analytics module 50 and entity resolution module 70 (represented as dashed line element 90 in FIG. 1). As previously noted herein, each computing device can communicate with other computing devices via any suitable wired or wireless network(s) (i.e., as indicated by the connecting arrows between modules 20-70 and the data store 10 as shown in FIG. 1).

Operation of the system 2 to provide search results to an analyst is now described with reference to the flow chart of FIG. 2. At 100, a search or analytic request for data from the data store 10 is initiated by an analyst using the visualization and interactive analysis module 50 (e.g., implemented as a user interface at a computing device of the analyst). The visualization and interactive analysis module 50 communicates the request to the fusion module 20 for processing of the request. As previously noted, the data store 10 includes source data 12 and analytic data 14 (generated via the auto analytics module 18, search and content mining module 40, interactive text analytics module 60, and/or entity resolution module 70), and both types of data are searched at 110 (utilizing the search and content mining module 40) to identify data within the data store 10 that matches the search or analytic request.

At 120, the identified data is analyzed, utilizing the reporting module 30, and an initial, result set is formed or generated utilizing facets associated with the identified data. The initial result set summarizes and represents the identified data but is smaller in data size. For example, if the size of the identified data is on the order of gigabytes or greater (e.g., terabytes or petabytes), a result set that summarizes the identified data can be generated that is on the order of megabytes or smaller. The result set is generated that can be visualized to represent the identified data in a useful manner. For example, the result set can include one or more data summary reports that facilitate a suitable visualization of the identified data, such as a representation of the identified data in the form of a chart or a graph. Since the size of the identified data (particularly for data stores that store massive amounts of data) may be so large that the data cannot be analyzed utilizing the analysis tools of the analyst, the identified data is not initially provided to the fusion module 20. Instead, the one or more summary reports of the result set are provided to the fusion module 20.

At 130, the fusion module 20 determines whether the data size of the result set representing or summarizing the identified data is no greater than (i.e., less than or equal to) a threshold value (e.g., a data size value that is a maximum size that can be processed by the fusion module 20 and/or the visualization and interactive analysis module 50). If the data size of the result set is no greater than the threshold value, the result set (including the identified data represented by the result set) is provided at 140 to the fusion module 20 and/or the visualization and interactive analysis module 50 for further processing.

Alternatively, if the data size of the result set is greater than the threshold value, the result set is filtered at 150 to generate a successive result set of smaller size in relation to the original and/or prior result set. Filtering of the result set can be accomplished, e.g., via user input by the analyst via the visualization and interactive analysis module 50. For example, one or more data summary reports generated by the reporting module 30 can be visualized as graphical displays of data rendered within a user interface by the visualization and interactive analysis module 50 (such as the user interface displays depicted in FIGS. 3-7). The analyst can selectively filter the result set based upon a selection of a number of different filter factors, such as a date range, a geographic area or region, specific types of records (e.g., cellular call records), etc. associated with the identified information of the result set. The filter factors are provided to the reporting module 30, and the reporting module generates a further or successive result set that is smaller in data size in relation to the previous result set based upon the filter factors selected by the analyst.

Figure 2:
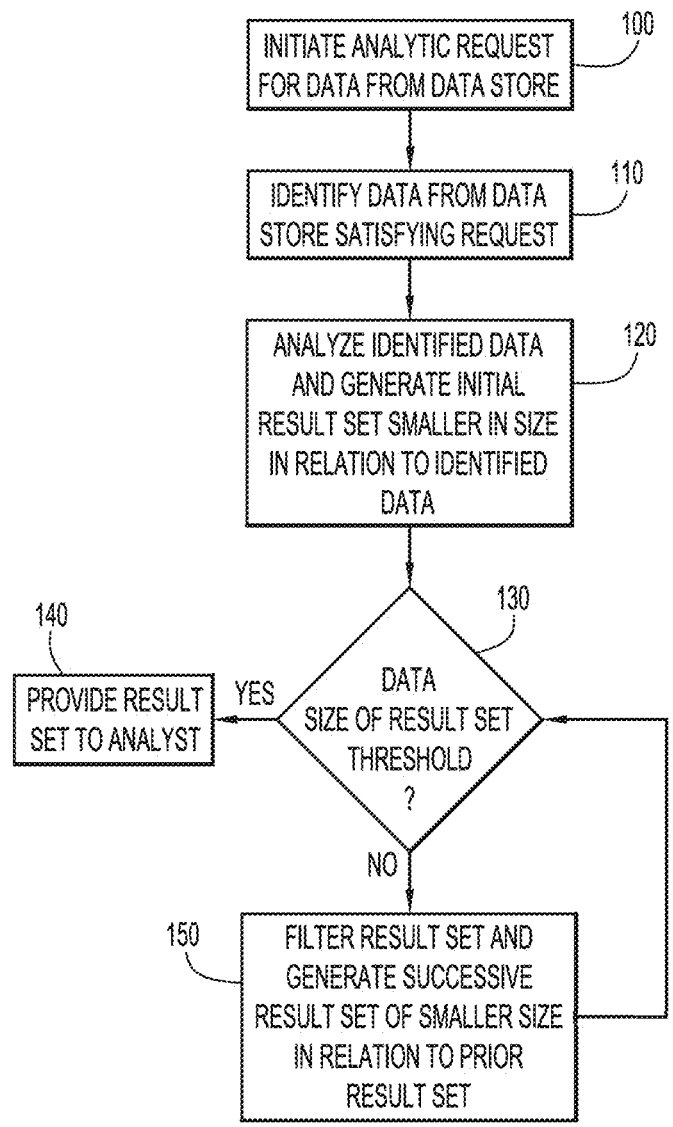
FIG. 2 is a flow diagram illustrating processing of a large amount of data for interactive analysis according to an embodiment of the present invention.
Figure 3:
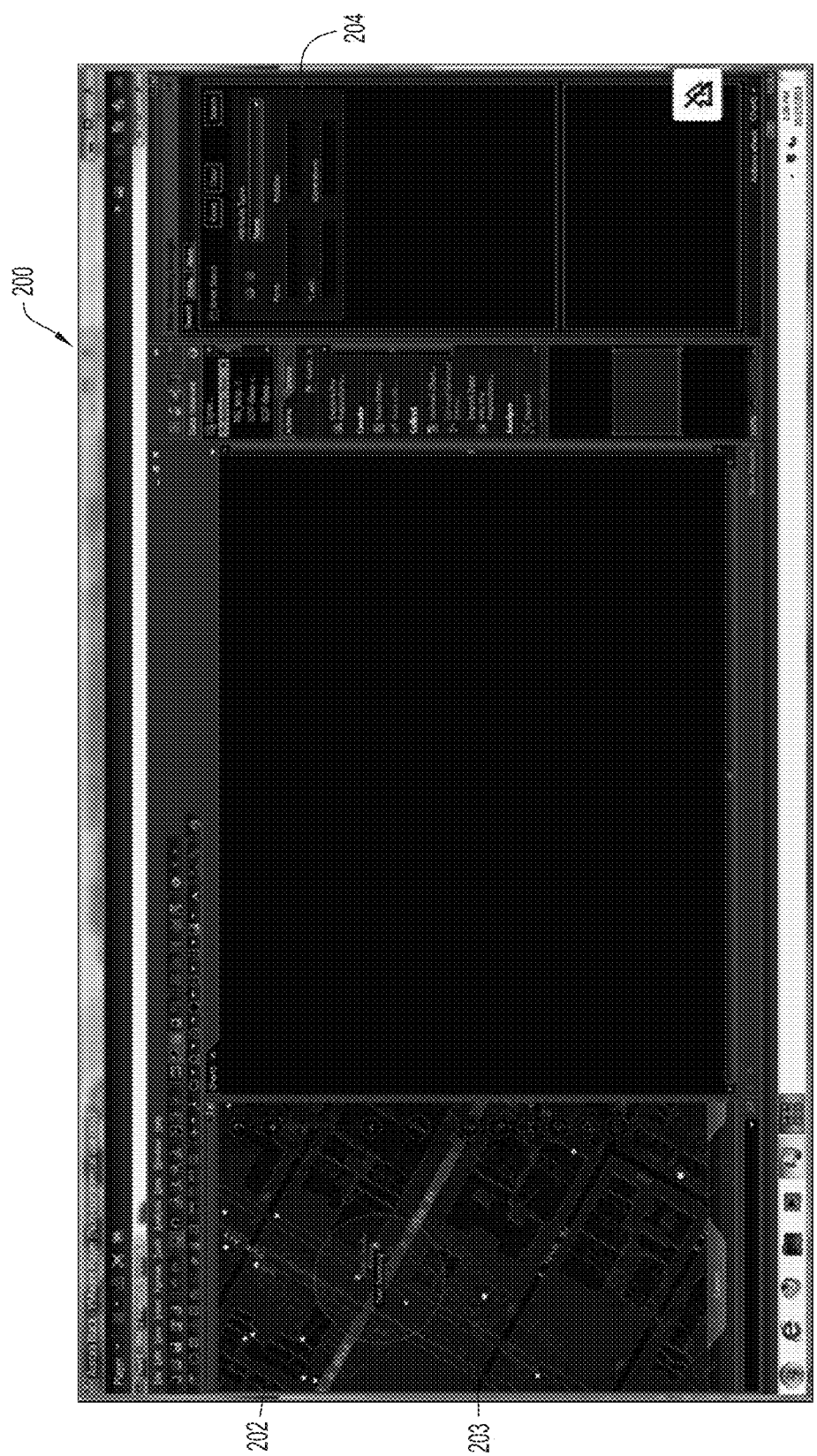
FIGS. 3-7 provide graphical illustrations of a user interface that provides visualization of data in order to facilitate a reduction in the size of the data for further analysis according to an embodiment of the present invention.

As indicated by FIG. 2, the process steps of 130 and 150 are repeated in an iterative manner until the data associated with the successive result set that summarizes the identified information of the analytic request is no greater than the threshold value. At such point where the result set represents a data size that is no greater than the threshold value, identified data associated with the information of the result set is provided for analysis by the fusion module 20 and/or the visualization and interactive analysis module 30.

An example embodiment utilizing the system and methods of the present invention is now described with reference to the user interface displays depicted in FIGS. 3-7. In this example embodiment, call data records are analyzed within a large metropolitan city. The user interface 200 depicted in FIGS. 3-7 is generated by the visualization and interactive analysis module 50 at an analyst's computing device based upon data summary reports generated by the reporting module 30 and provided to the fusion module 20. In this example embodiment, the analyst requests a search of the data store 10 for call records and related information, including cell tower locations, for New York City. The data store 10 includes about 1 trillion call data records that are accessible for search and analysis. An example of how information from the data summary reports for the initial result set are visualized is depicted within the user interface 200 of FIG. 3. The user interface 200 comprises an interactive display including a graphical representation provided within a panel or window 202 of the user interface 200, where the graphical representation provides a mapped view of the city (e.g., around a train station or other densely populated area). The analyst may be interested, e.g., in determining which entities made cell phone calls during a particular time period in the depicted area of the city. An analytic (e.g., search) request is initiated by the analyst (via the visualization and interactive analysis module 50) that provides search terms in relation to this request. Another window 204 of the user interface 200 provides fields for input of information by the analyst, including information that may be used to filter identified information uncovered from the data store 10 in relation to the analytic request.

A portion of the mapped view within window 202, such as region 203, can be selected by the analyst utilizing the user interface tools of module 50. Selection of this portion by the analyst comprises a filtering operation which generates a result set having a data size that is smaller than the result set associated with the visualized summary reports shown in FIG. 3.

Figure 4:
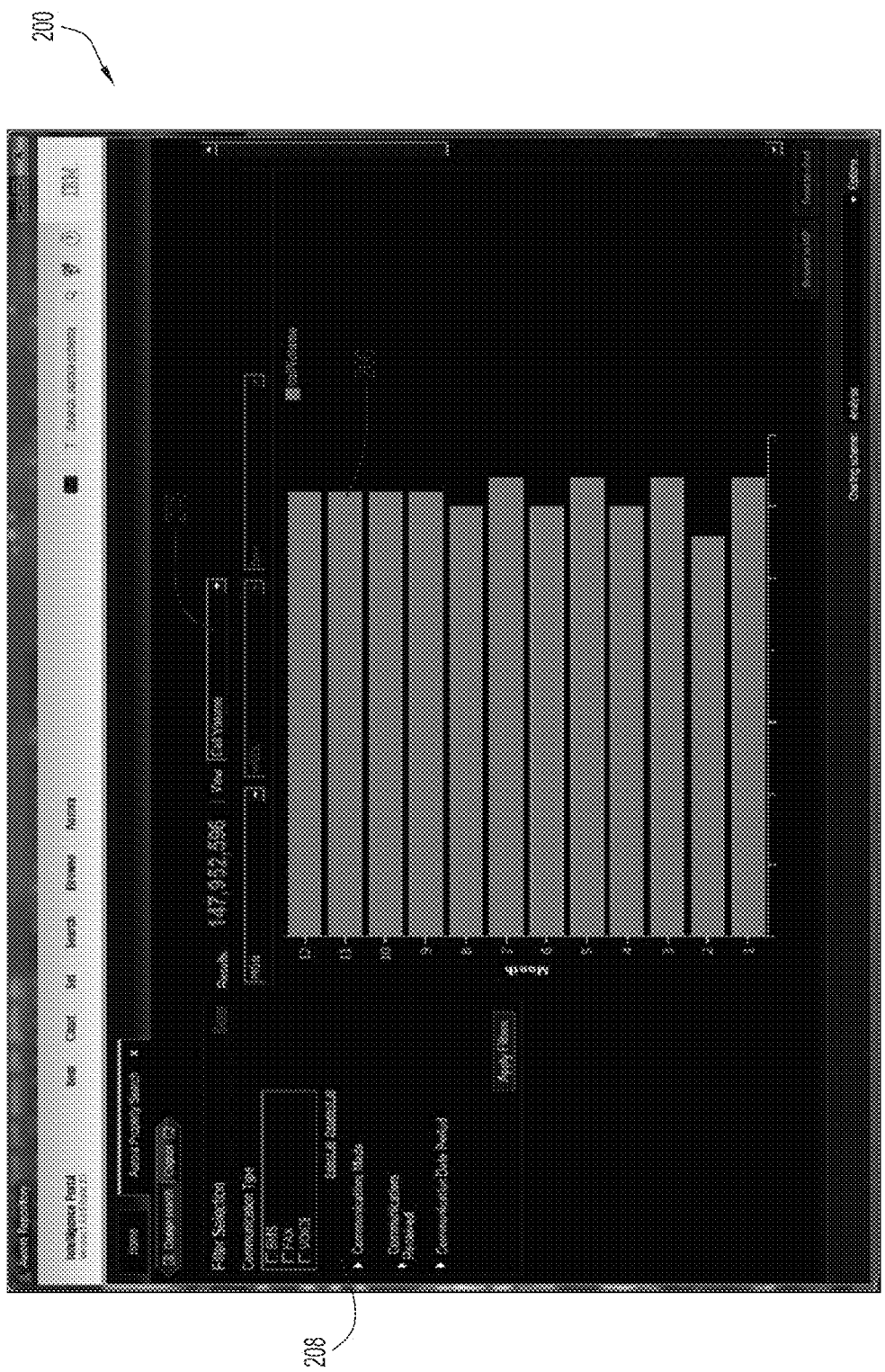

Referring to FIG. 4, the filtered result set shows the number of call records for the selected region 203 over a year, where the calls per month are represented by bars 206 in a chart. The data field 205 in the user interface 200 allows the analyst to select different views of the data (e.g., viewing call volume in FIGS. 4 and 5 vs. viewing a grid of specific calls in FIG. 6). A number of different filtering options are provided in the user interface 200 depicted in FIG. 4, including a selection to display calls in the region 203 on a daily basis, weekly basis, etc. as well as types of calls/communications and other features in window 208. The filtered results indicate that over 148 million calls (of the trillion+ calls stored within the data store 10) are in the identified information from the data store in the filtered result set. The data size of this result set may still be too large for analysis via the visualization and interactive analysis module 50 (i.e., the size of the result set is greater than a specified threshold value), such that further filtering of the data is required. However, the summary reports visualized via the user interface 200 (which is implemented with module 50) are of a smaller size than the data size corresponding with the current result set, which enables a relatively fast and efficient mechanism to allow the analyst to further filter the data within the result set.

Figure 5:
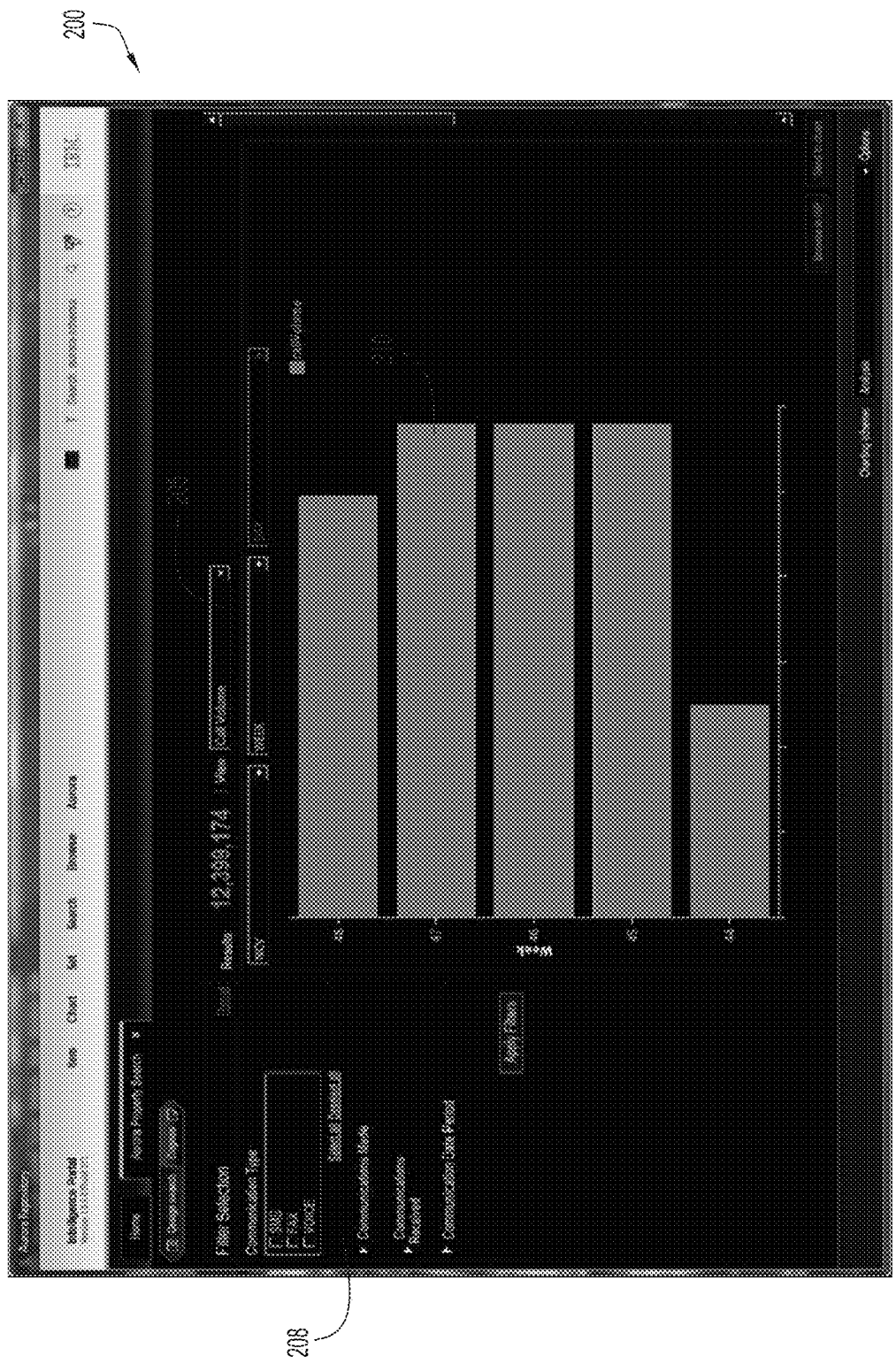

Selection by the analyst (using the features of module 50) of a single month (e.g., November) from the result set visualized in FIG. 4 results in a further filtering of the result set to obtain the successive result set visualized by the user interface 200 as depicted in FIG. 5. In this current result set, the number of calls has been filtered down to around 12 million.

The analyst can continue to filter the result set (e.g., if the current result set includes data that is still greater than the threshold value). For example, the analyst can select a specific day to view the specific call records associated with the region 203 on the particular day. Visualization of the filtered result set is depicted in the user interface 200 of FIG. 6, which indicates the result set includes 735 calls and with data for specific calls being visualized in a grid format 212. Thus, the call records data of about 1 trillion calls in the data store 10 is searched and filtered down to a manageable and meaningful number (735) with relative ease.

Figure 6:
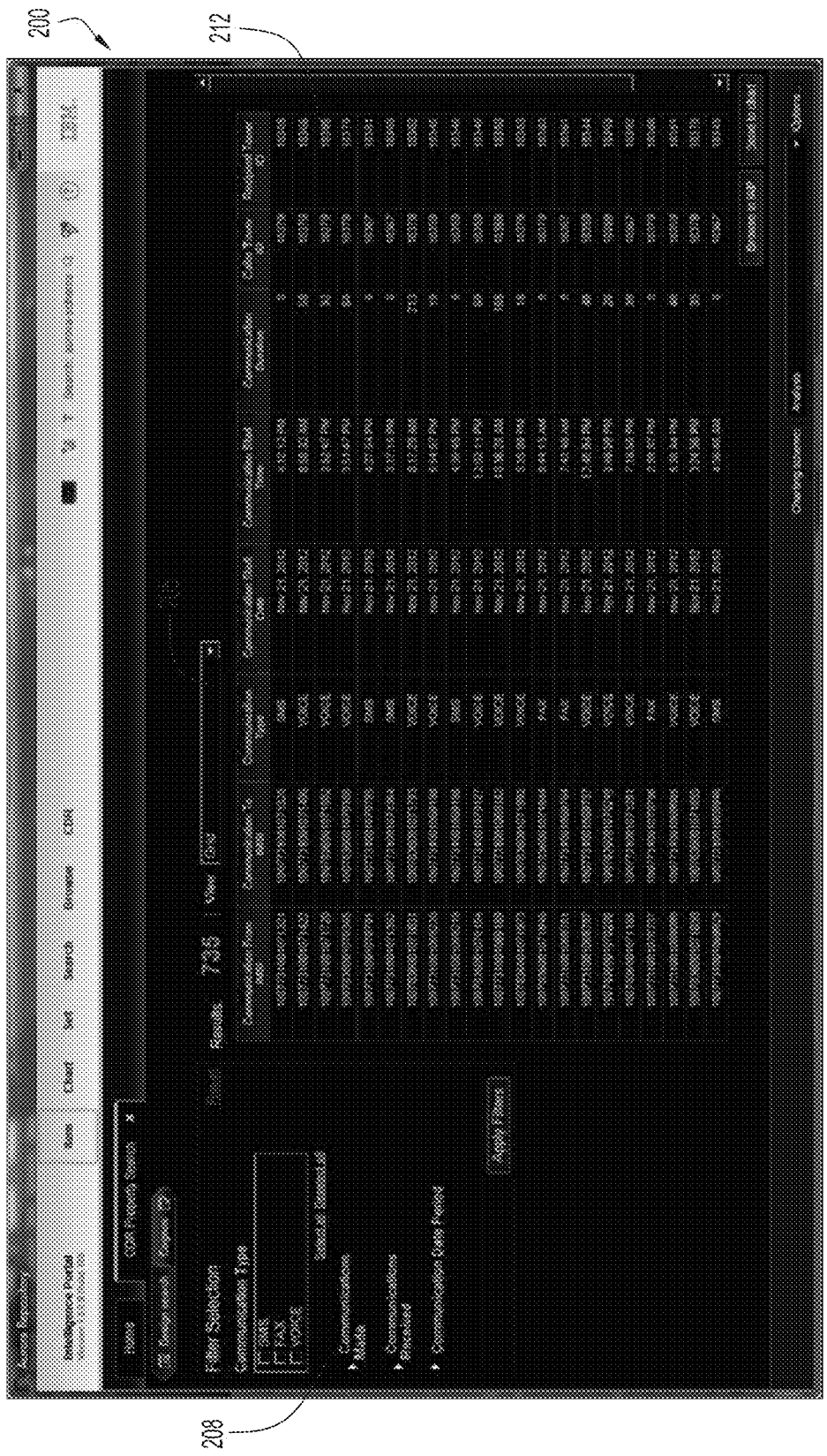
Figure 7:
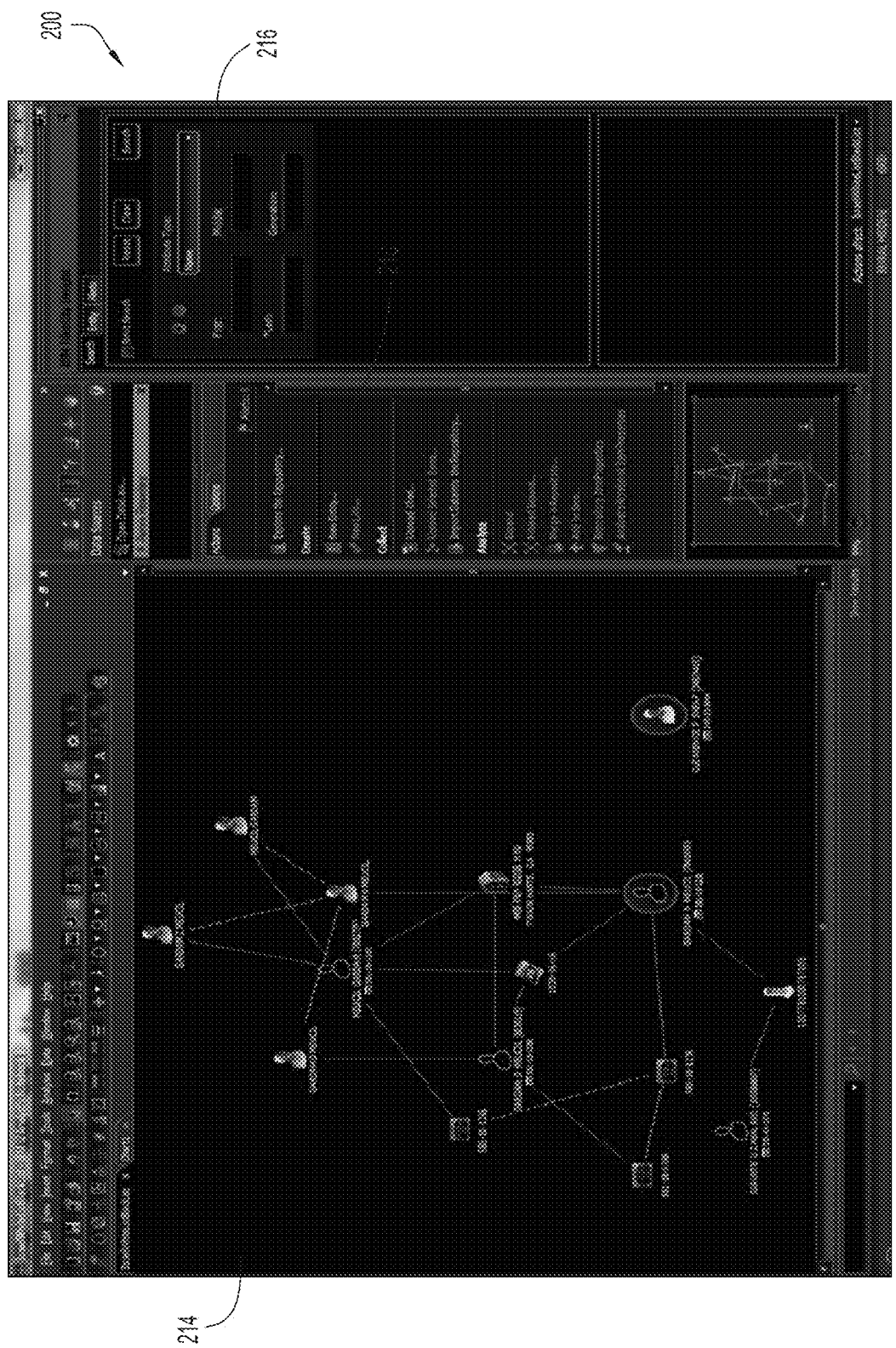

Referring to FIG. 7, the analyst can also have the current result set (i.e., 735 call records as depicted in FIG. 6) visualized in different formats. For example, some or all of the call records for the selected day in the selected region 203 of the city can be visualized in a node map or graph linking nodes each other to represent calls made between the entities (e.g., individuals making the calls) or point locations (e.g., a house or dwelling). Searching of data within and/or further filtering of the current result set is enabled via input by the analyst within field of window 216, while window 218 enables the analyst to search other data sources and/or perform other data analysis operations. In this example, the current result set includes data that is of sufficiently reduced size (the data size is no greater than the threshold value) such that the entire data for the current result set can now be provided from the data store 10 to the one or computing devices associated with the analyst for further analytic operations to be performed by the fusion module 20 and/or the visualization and interactive analysis module 50.

Thus, embodiments of the present invention facilitate real-time interaction by an analyst (e.g., utilizing software tools at the computing device of the analyst) of massive data results (e.g., peta-bytes or larger) obtained from a data store as a result of an analytic request by the analyst. Since summary reports of each result set are utilized to visualize data within a user interface operated by the analyst, filtering of each successive result set can be performed rapidly and efficiently until the data size of a successive result set is no greater than a specified threshold value. The entire data of a result set is not provided to the computing device(s) operated by the analyst until the data size is no greater than the threshold value.

It will be appreciated that the embodiments described above and illustrated in the drawings represent only a few of the many ways of implementing embodiments for reducing a large amount of data to a size available for interactive analysis.

The environment of the present invention embodiments may include any number of computer or other processing systems (e.g., client or end-user systems, server systems, source systems, target systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, database management system, analysis modules, data quality profiler module, data quality engine, data quality reports module, linking module, ETL or other tools, etc.). These systems may include any types of monitors and input devices (e.g., keyboard, mouse, voice recognition, etc.) to enter and/or view information.

It is to be understood that the software (e.g., auto analytics module, data store services module, fusion module, reporting module, visualization and interactive analysis module, interactive text analytics module, entity resolution module, etc.) of the present invention embodiments may be implemented in any desired computer language and could be developed by one of ordinary skill in the computer arts based on the functional descriptions contained in the specification and flow diagrams or charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client, source, target, and server systems, and/or any other intermediary processing devices. The software and/or algorithms described above and illustrated in the flow diagram or chart may be modified in any manner that accomplishes the functions described herein. In addition, the functions in the flow diagram or chart or description may be performed in any order that accomplishes a desired operation.

The software of the present invention embodiments (e.g., auto analytics module, data store services module, fusion module, reporting module, visualization and interactive analysis module, interactive text analytics module, entity resolution module, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network linking any two or more computing devices may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases or storage structures (e.g., files, databases, data structures, data or other repositories, etc.) to store information (e.g., source data, analytic data, data models, structured and unstructured data, etc.). The data store may be implemented by any number of any conventional or other databases, or storage structures (e.g., files, databases, data structures, data or other repositories, etc.) to store information (e.g., source data, analytic data, data models, structured and unstructured data, etc.). The data store may be included within or coupled to a server, source, target, and/or client systems. The data store may be remote from or local to the computer or other processing systems, and may store any desired data (e.g., source data, analytic data, data models, structured and unstructured data, etc.).

The source and analytic data may be arranged within the data store in any desired manner that facilitates suitable searching, analysis and other processing of the data (e.g., extracting entity and relationship data). For example, the data store may include any quantity of areas to store, process, and/or migrate the data. The areas may each be of any quantity, include any suitable storage capacity, store any desired data, and employ any data models (e.g., source, target, or other data model, etc.). The analytic data may include any suitable types of facets comprising information that links data items or instances of data based upon identified relationships between the instances of data.

The present invention embodiments may employ any number of any type of user interface (e.g., Graphical User Interface (GUI), command-line, prompt, etc.) for obtaining or providing information (e.g., information associated with summary reports generated by the reporting module, etc.), where the interface may include any information arranged in any fashion suitable for enabling interaction with an analyst and filtering of data. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The summary reports generated by the reporting module may be visualized within user interfaces to include any information arranged in any fashion, and may be configurable based on rules or other criteria to provide desired information to a user (e.g., based upon filtering or other characteristic information input by the analyst, etc.).

The present invention embodiments are not limited to the specific tasks or algorithms described above, but may be utilized for reducing a large amount of data to a size available for interactive analysis for any suitable purpose.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or one or more computer readable storage media) having computer readable storage code or program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to one or more flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the drawings illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed:

1. A computer-implemented method of processing a request for data comprising:
   identifying data within a data store satisfying the request, wherein a quantity of the identified data is greater than a threshold;
   analyzing the identified data to produce an initial result set with a reduced quantity of data including information summarizing the identified data, the analyzing the identified data further comprising:
     consolidating multiple instances of a relationship between a same group of entities to form a facet,
     producing the information summarizing the identified data based on the facet,
     visualizing the information summarizing the identified data as one or more graphical displays of data rendered within a user interface, and
     selectively filtering the identified data based upon a selection of a plurality of different filter factors associated with the identified data to generate an initial result set that is smaller in size in relation to the identified data set; and
   generating one or more succeeding result sets each from a corresponding prior result set until a succeeding result set includes a quantity of data that is at or below the threshold, wherein each succeeding result set includes a reduced quantity of data relative to the corresponding prior result set, and generating each succeeding result set includes:
     filtering the corresponding prior result set and generating the succeeding result set including information summarizing the filtered result set based on the facet.

2. The computer-implemented method of claim 1, further comprising:
   providing the identified data associated with the information from the succeeding result set, wherein the quantity of the identified data is at or below the threshold.

3. The computer-implemented method of claim 1, wherein the filtering of the corresponding prior result set includes:
   filtering the prior result set based on one or more criteria from a user.

4. The computer-implemented method of claim 1, wherein the threshold indicates an amount of data enabling visual analysis of the identified data.

5. The computer-implemented method of claim 1, wherein the data store includes structured and unstructured data.

6. The computer-implemented method of claim 1, wherein the data store includes unstructured data, and the identifying data within the data store satisfying the request includes:
   extracting entity and relationship data from the unstructured data, wherein the information summarizing one or more from a group of the identified data and the filtered result set is based on the extracted entity and relationship data.

7. The computer-implemented method of claim 1, further comprising:
   displaying each result set within a user interface accessible by a user, wherein the user interface facilitates depiction of one or more result sets in a plurality of different formats.

8. A system for processing a request for data, the system comprising:
   a data store including data; and
   at least one processor configured with logic to perform operations of:
     identifying data within the data store satisfying the request, wherein a quantity of the identified data is greater than a threshold;
     analyzing the identified data to produce an initial result set with a reduced quantity of data including information summarizing the identified data, the analyzing the identified data further comprising:
       consolidating multiple instances of a relationship between a same group of entities to form a facet,
       producing the information summarizing the identified data based on the facet,
       visualizing the information summarizing the identified data as one or more graphical displays of data rendered within a user interface, and
       selectively filtering the identified data based upon a selection of a plurality of different filter factors associated with the identified data to generate an initial result set that is smaller in size in relation to the identified data set; and
     generating one or more succeeding result sets, each from a corresponding prior result set, until a succeeding result set includes a quantity of data that is at or below the threshold, wherein each succeeding result set includes a reduced quantity of data relative to the corresponding prior result set, and generating each succeeding result set includes:
       filtering the corresponding prior result set and generating the succeeding result set including information summarizing the filtered result set based on the facet.

9. The system of claim 8, wherein the at least one processor is further configured with logic to perform the operations of:
   providing the identified data associated with the information from the succeeding result set, wherein the quantity of the identified data is at or below the threshold.

10. The system of claim 8, wherein the at least one processor is configured with logic to filter the corresponding prior result set by:
    filtering the prior result set based on one or more criteria from a user.

11. The system of claim 8, wherein the threshold indicates an amount of data enabling visual analysis of the identified data.

12. The system of claim 8, wherein the data store includes structured and unstructured data.

13. The system of claim 8, wherein the data store includes unstructured data, and the at least one processor is configured with logic to identify data within the data store satisfying the request by:
    extracting entity and relationship data from the unstructured data, wherein the information summarizing one or more from a group of the identified data and the filtered result set is based on the extracted entity and relationship data.

14. The system of claim 8, wherein the at least one processor is further configured with logic to perform the operations of:
displaying each result set within the user interface accessible by a user, wherein the user interface facilitates depiction of one or more result sets in a plurality of different formats.

15. A computer program product for processing a request for data within a data store, the computer program product comprising:
one or more computer readable storage media having computer readable program code embodied therewith, the computer readable program code configured to perform operations of:
identifying data within the data store satisfying the request, wherein a quantity of the identified data is greater than a threshold;
analyzing the identified data to produce an initial result set with a reduced quantity of data including information summarizing the identified data, the analyzing the identified data further comprising:
consolidating multiple instances of a relationship between a same group of entities to form a facet,
producing the information summarizing the identified data based on the facet,
visualizing the information summarizing the identified data as one or more graphical displays of data rendered within a user interface, and
selectively filtering the identified data based upon a selection of a plurality of different filter factors associated with the identified data to generate an initial result set that is smaller in size in relation to the identified data set; and
generating one or more succeeding result sets, each from a corresponding prior result set, until a succeeding result set includes a quantity of data that is at or below the threshold, wherein each succeeding result set includes a reduced quantity of data relative to the corresponding prior result set, and generating each succeeding result set includes:
filtering the corresponding prior result set and generating the succeeding result set including information summarizing the filtered result set based on the facet.

16. The computer program product of claim 15, wherein the computer readable program code is further configured to perform the operations of:
providing the identified data associated with the information from the succeeding result set, wherein the quantity of the identified data is at or below the threshold.

17. The computer program product of claim 15, wherein the computer readable program code is configured to filter the corresponding prior result set by:
filtering the prior result set based on one or more criteria from a user.

18. The computer program product of claim 15, wherein the threshold indicates a quantity of data enabling visual analysis of the identified data.

19. The computer program product of claim 15, wherein the data store includes unstructured data, and the computer readable program code is configured to identify data within the data store satisfying the request by:
extracting entity and relationship data from the unstructured data, wherein the information summarizing one or more from a group of the identified data and the filtered result set is based on the extracted entity and relationship data.

20. The computer program product of claim 15, wherein the computer readable program code is further configured to perform the operations of:
displaying each result set within a user interface accessible by a user, wherein the user interface facilitates depiction of one or more result sets in a plurality of different formats.

\* \* \* \* \*